Dec. 26, 1967 G. A. MATTHEWS 3,360,611
TELECOMMUNICATION LINE CLASS INDENTIFIER HAVING INDUCTIVE COUPLING MEANS
Filed Oct. 30, 1964
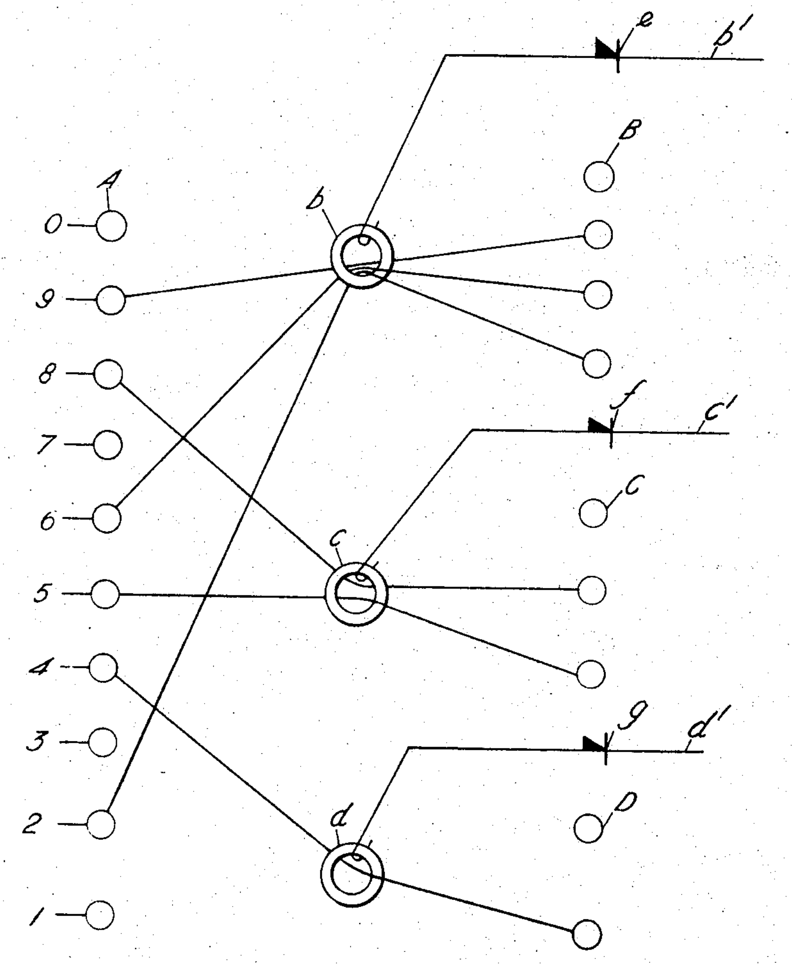

United States Patent Office 3,360,611
Patented Dec. 26, 1967

3,360,611

TELECOMMUNICATION LINE CLASS IDENTIFIER HAVING INDUCTIVE COUPLING MEANS

George Arthur Matthews, Beeston, England, assignor to Ericsson Telephones Limited, Engineers and Manufacturers of Telephone Works, Beeston, England, a British company Filed Oct. 30, 1964, Ser. No. 407,711
Claims priority, application Great Britain, Oct. 31, 1963, 43,048/63
4 Claims. (Cl. 179—18)

ABSTRACT OF THE DISCLOSURE

A current-carrying conductor interconnecting terminals on either side of a cross connection frame used in a telecommunications exchange passes through a magnetic core which in response to a rise in D.C. current through the conductor provides an output on an output wire indicative of a subscriber's class of service.

This invention relates to telecommunication line class identification.

In telecommunication exchanges it is known to classify lines according to the service facilities which they afford. For instance subscribers' lines are frequently classified as ordinary, barred trunk, coin-box, rented call office and so on. In telecommunication exchanges cross connection frames are commonly provided in which jumpers form connections between terminals on one side of the frame and terminals on the other side. For example, in the case of subscribers' lines the terminals on one side may be arranged in numerical sequence of the subscribers' directory numbers, while the terminals on the other side are arranged in some other convenient order, e.g. in an order determined by the arrangement of subscribers' calling equipment.

According to the invention there is provided telecommunication line class identification means which includes a conductor corresponding to each line connected to the means and arranged to carry current during a call from the line to which the conductor corresponds, a signal output lead corresponding to each class in which said lines are classified and an inductive coupling, coupling each signal output lead to the conductor corresponding to the lines in the class to which the signal output leads corresponds. An embodiment of the invention will now be described with reference to the accompanying drawing which shows diagrammatically part of a cross connection frame at which the private wires of ten subscribers' lines numbered 1–0 are terminated on one side of the frame respectively at ten terminals A. The other side of the frame comprises three groups of terminals B, C, D representing respectively ordinary, coin-box and barred trunk lines. Between the two sides of the frame are three rings *b, c, d* of magnetic material, corresponding respectively to the three terminal groups B, C, D. Each ring *b, c, d* is threaded by a signal output lead as shown at *b, c, d* respectively.

Supposing that subscribers 2, 6, 9 are ordinary lines, jumpers, represented by full lines, are taken from the appropriate A terminals to respective individual terminals in the B group each jumper being threaded through the ring *b*. Similarly, jumpers from coin-box lines 5, 8 are taken from the appropriate A terminals to individual terminals in the coin-box group C, and are threaded through the ring *c*. The barred trunk subscriber 4 is connected to a terminal in the barred trunk group D by a jumper which threads the ring *d*.

When a subscriber, e.g. the subscriber 9, originates a call, a current starts to flow in the jumper connected to the appropriate A terminal i.e. in the jumper connected to terminal 9. The ring *b* serves as an inductive coupling between this jumper and the signal output lead *b*. While the current in the jumper is rising, an output signal is induced in the signal output lead *b*. The signal terminates as soon as the current in the jumper is established. When the call ends, a signal of opposite polarity is induced in the signal output lead due to the decay of current in the jumper. This signal may however be suppressed by providing a diode as shown at *e*. An output signal is delivered at the lead *b* each time a call is originated by a subscriber whose line is jumpered through the ring *b* to a terminal in the B group of terminals, i.e. each time a call is originated by an ordinary subscriber. Similarly an output signal is delivered at the lead *c* each time a call is originated by a coin-box line, and at the lead *d* for each call originated by a barred-trunk line. The leads *c, d* may also be provided with diodes *f, g* respectively if desired.

It is important to note that the signal delivered at an output lead is dependent on the build up of current in the jumper and is independent of the length of time the current flows once the build up is complete. It is therefore of no significance whether the current flows long enough to operate or hold a relay on the one hand, or whether, on the other hand, the current flows only for a very short period such as is common with the so-called pulse techniques. The identification means may therefore be applied equally in conventional exchanges such as those employing relays or in the so-called electronic exchanges employing pulse techniques. In the latter event it may be found convenient to terminate a signal output lead at a bi-stable device which is triggered by the first of a series of repetitive pulses and not by subsequent pulses of the series.

While a ring will generally be the most convenient form of coupling between a jumper and a signal output lead, other forms of coupling, e.g. a sleeve, may be used.

Although the identification means is of particular use for identifying the class of service of a calling subscriber's line, it can readily be employed for other purposes.

What I claim is:

1. Telecommunication line class identifying means which includes a conductor corresponding to each line connected to the means and arranged to carry currents during a call from the line to which the conductor corresponds, a signal output lead corresponding to each class in which said lines are classified and an inductive coupling means linking each signal output lead with the conductors corresponding to the lines in the class to which the signal output lead corresponds, said coupling means responding to the build up of direct current flowing in a single conductor consequent upon the initiation of a cell made on the line corresponding thereto and associated with the coupling to induce through said coupling an output in the signal output lead without any other conductors associated with the coupling being energised.

2. Identifying means as claimed in claim 1 in which an inductive coupling is a ring of magnetisable material, threaded by a signal output lead and by conductors corresponding to the lines in the class to which the signal output lead corresponds.

3. Identifying means as claimed in claim 2 in which a signal output lead includes a diode.

4. Identifying means as claimed in claim 1 in which a conductor is a jumper of a cross connection frame.

References Cited

UNITED STATES PATENTS

| | | | |
|---|---|---|---|
| 2,955,166 | 10/1960 | McCreary | 179—18.61 |
| 3,200,203 | 8/1965 | Bray et al. | 179—18.61 |
| 3,231,680 | 1/1966 | Yamato et al. | 179—18.61 |

KATHLEEN H. CLAFFY, *Primary Examiner.*

L. A. WRIGHT, *Assistant Examiner.*